(12) United States Patent
Zoubek et al.

(10) Patent No.: US 7,186,068 B2
(45) Date of Patent: Mar. 6, 2007

(54) FIXING ELEMENT

(75) Inventors: Viktor Zoubek, Jablonec nad Nisou (CZ); Vaclav Sasek, Liberec (CZ)

(73) Assignee: A. Raymond & CIE, Grenoble (FR)

( * ) Notice: Subject to any disclaimer, the term of this patent is extended or adjusted under 35 U.S.C. 154(b) by 0 days.

(21) Appl. No.: 10/529,134

(22) PCT Filed: Sep. 18, 2003

(86) PCT No.: PCT/EP03/10364

§ 371 (c)(1),
(2), (4) Date: Mar. 23, 2005

(87) PCT Pub. No.: WO2004/031598

PCT Pub. Date: Apr. 15, 2004

(65) Prior Publication Data

US 2005/0260060 A1    Nov. 24, 2005

(30) Foreign Application Priority Data

Sep. 27, 2002 (DE) .............................. 102 45 276

(51) Int. Cl.
*F16B 19/00* (2006.01)
(52) U.S. Cl. .................................................... 411/510
(58) Field of Classification Search ........ 411/508–510, 411/21, 22; 24/297, 453
See application file for complete search history.

(56) References Cited

U.S. PATENT DOCUMENTS

| 2,424,757 | A | | 7/1947 | Klumpp, Jr. |
| 3,079,581 | A | * | 2/1963 | Klumpp, Jr. ............... 438/557 |
| 3,775,927 | A | * | 12/1973 | Meyer .................... 52/718.06 |

(Continued)

FOREIGN PATENT DOCUMENTS

| DE | 2153062 A1 | 4/1972 |
| DE | 4307434 A1 | 9/1994 |
| DE | 20101328U U1 | 5/2001 |
| EP | 0615071 A2 | 9/1994 |

OTHER PUBLICATIONS

International Search Report; Dated Dec. 19, 2003; 2 pages.

*Primary Examiner*—Flemming Saether
(74) *Attorney, Agent, or Firm*—Dickinson Wright PLLC

(57) ABSTRACT

The invention relates to a fixing element for fixing a component to a support part. The element comprises a retaining part (1) for the component to be fixed and a hollow anchor foot (2), which is used to anchor the fixing element in a continuous bore of the support part. Two spring arm pairs (5, 6), which widen towards the retaining part (1), run from the lower edge in opposing openings (4) in the wall of the anchor foot (2), one short and one long spring arm (5 and 6) respectively lying adjacent to one another in one of the openings (4) and being offset in relation to the short and long spring arm (5 and 6) in the other opening (4). As both spring arm pairs (5, 6) are graduated towards the retaining part (1), starting from a respective outer edge (11, 12) that lies at the greatest radial distance from the central axis (M) of the fixing element, front faces (7, 8) and step faces (9, 10) are created on different horizontal planes. The faces can rest on the underside of a support part. Vertical bearing faces are created simultaneously (13, 14) at different radial distances from the central axis (M). The vertical faces can rest on the peripheral face of bores of varying diameters. The fixing element can thus be used both for a wide range of material strengths of the support part and for a wide range of diameters of the bore with high functional reliability. Both ranges can be covered by small graduation increments. An umbrella-shaped, spring stop (15) lying between the retaining part (1) and the anchor foot (2) permits a continuous adaptation between the stages for the range of material strengths.

15 Claims, 2 Drawing Sheets

U.S. PATENT DOCUMENTS

| | | | |
|---|---|---|---|
| 4,704,059 A | * 11/1987 | Nakama et al. | 411/182 |
| 4,712,341 A | * 12/1987 | Harris et al. | 52/208 |
| 4,981,310 A | 1/1991 | Belisaire | |
| 5,448,809 A | * 9/1995 | Kraus | 24/453 |
| 5,975,820 A | * 11/1999 | Kirchen | 411/339 |
| 6,315,510 B1 | * 11/2001 | Sturies et al. | 411/182 |
| 6,560,819 B2 | * 5/2003 | Mizuno et al. | 16/2.2 |
| 6,612,795 B2 | * 9/2003 | Kirchen | 411/508 |
| 6,719,513 B1 | * 4/2004 | Moutousis et al. | 411/510 |

* cited by examiner

FIXING ELEMENT

CROSS-REFERENCE TO RELATED APPLICATIONS

This application is a National Stage of International Application No. PCT/EP03/10364, filed on Sep. 18, 2003, which claims priority to German Patent Application No. 102 45 276.8, filed on Sep. 27, 2002. The disclosures of the above applications are incorporated herein by reference.

BACKGROUND OF THE INVENTION

The invention pertains to a fixing element for fixing a component on a support part, wherein the fixing element comprises a retaining part for the component to be fixed, a hollow anchor foot for anchoring the fixing element in a continuous bore of the support part, and a spring stop that is arranged between the retaining part and the anchor foot, wherein the wall of the anchor foot contains two opposite openings, wherein two spring arms that are spread apart in the direction of the retaining part respectively originate at the lower edges of the openings, wherein the ends of the spring arms have faces that adjoin the underside of the fixing element after it is inserted into the bore of a support part, and wherein the faces of two diagonally opposing spring arm pairs lie in two different horizontal planes.

Fixing elements of this type are generally known, but are primarily suitable for being fixed in a bore of the support part that has a certain diameter and for a certain material thickness of the support part. This means that specially adapted fixing elements must be respectively manufactured for bores with different diameters and for support parts with different material thicknesses.

DE 201 01 328 U1 discloses a fixing element in which tolerance compensation between the fixing points can be achieved when mounting one planar body on another with the aid of several such fixing elements. This is achieved by realizing the fixing element in two parts and by allowing a certain mobility of the anchor foot in the retaining part perpendicular to the center axis. The anchor foot is prevented from turning in the retaining part by lateral projections on the shaft. Although not required, the outside surfaces of the spring arms may be divided into two sections by a shoulder such that one planar body can assume an intermediate or pre-assembly position relative to other planar body during the installation, wherein the connection is still loose and one body can still be laterally moved in the aforementioned intermediate or pre-assembly position. This is realized by making the diameter defined by the outside surfaces of the spring arms smaller behind the aforementioned shoulder than the diameter of the bore in the body, into which the anchor foot is inserted. The actual fixing of the component takes place in a second step, when a shoulder on the free end of the spring arms engages behind the edge of the bore.

DE 2 153 062 A1 discloses a fixing element in which the free ends of the spread-apart spring arms are concavely bent at the location at which they should come in contact with the edge of the bore in the support part. This allegedly serves to anchor the same fixing element in bores with diameters that vary over a certain range. However, a secure and rigid anchoring cannot be achieved with the curved contact surface of the spring arms; another reason for this is that this publication does not aim to realize anchoring in bores with different diameters of a certain size, but rather with diameters that vary over a certain range. Pairs of laterally and perpendicularly extending projections on the shaft are only able to prevent a horizontal displacement of the anchor foot in a bore with a certain diameter, i.e., in a bore of only one size. The fixing element could not even be installed in a bore with a smaller diameter, and the installation in a bore of larger diameter could lead to the spring arms disengaging due to the lateral play of the anchor foot.

U.S. Pat. No. 2,424,757 discloses a fixing element for fixing a cylindrical component on a plate-shaped support part. The fixing element consists of a sleeve that is pushed onto the cylindrical component and from which a pair of spread-apart spring arms protrudes laterally. The free ends of these spring arms contain several steps. This is intended to allow the anchoring in support parts with different thicknesses. The risk that the spring arms will disengage is also not eliminated in this case such that the component practically cannot be securely fixed in the bore of a support part.

DE 43 07 434 A1 and corresponding publication EP 0 615 071 B1 respectively disclose a holding element that contains an anchor foot in the form of a base body of rectangular cross section. All four lateral surfaces of this base body are provided with snap-in tabs that respectively lie diagonally opposite one another and can be snapped into recesses in the lateral surfaces of the base body. Two opposing snap-in tabs are realized in T-shaped form and have faces that point to the retaining part on the T-crosspieces. This allegedly results in a centering cage effect and consequently a secure retention in the bore of a support part, even if the retaining part turns about its longitudinal axis in the bore. The faces of the snap-in tabs provided may all lie in the same horizontal plane. Alternatively, pairs of snap-in tabs may also lie in different horizontal planes such that the retaining part can be utilized on support parts of different thicknesses.

DE-GM 81 13 637 discloses a holding element that, in theory, also allows the utilization on support parts with different material thicknesses. According to one of the embodiments described in this publication, two pairs of elastic tabs that are directed toward the retaining part are provided on a base body that forms the anchor foot of round cross section, wherein the faces of the elastic tab pairs may also lie in different horizontal planes pair-by-pair. In this case, the first elastic tabs of both elastic tab pairs lie directly adjacent to one another on the circumference of the base body analogous to the other elastic tabs of the elastic tab pairs, i.e., in such a way that the elastic tabs of the shorter elastic pair lie directly opposite of the elastic tabs of the longer elastic pair, i.e., the respective elastic tabs are diagonally offset relative to one another. This is intended to allow a secure retention here in support parts with, specifically, two different material thicknesses. In order to utilize the holding element on support parts with more than two material thicknesses, additional elastic tab pairs with faces may be provided on the circumference of the base body in correspondingly different horizontal planes.

Known holding or fixing elements are designed for use in bores with different diameters in support parts or on support parts of different thicknesses or material thicknesses, the design of these holding or fixing elements is often relatively complicated and their manufacture is correspondingly costly. Nonetheless, a secure and rigid connection still cannot be ensured in all cases.

SUMMARY OF THE INVENTION

The invention is based on the objective of developing a fixing element of the initially mentioned type, in which the anchor foot is realized in such a way that it can be used on support parts with bores of different diameters as well as on support parts with different material thicknesses, while still ensuring a secure and rigid anchoring and, in particular, preventing the spring arms from disengaging when the fixing element is laterally loaded. The new fixing element should not only be suitable for use in bores with certain different diameters and on support parts with certain different thicknesses, but rather over an at least approximately continuous diameter range and an at least approximately continuous material thickness range.

According to the invention, this objective is realized in that the short spring arms as well as the long spring arms radially widen in the direction of the retaining part, namely from the lower edge of the respective opening to an outer edge of the short spring arms and an outer edge of the long spring arms, and are then radially recessed up to their respective face in the form of several steps such that several horizontal step surfaces are formed in different planes and several vertical contact surfaces are formed at different radial distances from the center axis M of the fixing element on each spring arm, wherein the faces or the individual horizontal step surfaces of one spring arm pair lie in the same respective planes and its individual vertical contact surfaces lie at the same respective radial distances from the center axis M, but in different planes and at different radial distances from the center axis M relative to the other spring arm pair.

This makes it possible to utilize a single fixing element for different hole or bore diameters in the support part and for different material thicknesses of the support part. A broad range of different bore diameters and material thicknesses can be respectively covered in very small increments due to the faces or step surfaces that lie in offset horizontal planes and the vertical contact surfaces that lie at offset radial distances from the center axis M.

It is advantageous that the longest radial distance between an outer edge of one spring arm and the center axis of the fixing element is longer than half the diameter of the largest bore in the support part by such an amount that the anchor foot cannot be disengaged if the fixing element is laterally loaded, and that the shortest possible radial distance between the root of the spring arms and the center axis is slightly shorter than half the diameter of the smallest bore in the support part. This also makes it possible easily to insert the anchor foot of the fixing element into the smallest bore provided.

The steps on the short spring arms and the steps on the long spring arms are preferably offset relative to one another in such a way that the faces or horizontal step surfaces of the long spring arms and the faces or horizontal step surfaces of the short spring arms are alternately brought into contact with the underside of the support part as the material thickness of the support part increases and the vertical contact surfaces of the short spring arms and the vertical contact surfaces of the long spring arms accordingly are alternately brought into contact with the circumferential surface of a bore as the bore diameter increases. The diametrical range of the bores and the material thickness range of the support part can be covered in particularly small increments due to these horizontal faces or step surfaces and vertical contact surfaces that are alternately offset on the two spring arm pairs. With respect to the material thickness range, the adaptation between the increments is realized continuously because the stop elastically comes into contact with the upper side of the support part.

BRIEF DESCRIPTION OF THE DRAWINGS

The invention is described in greater detail below by way of an example with reference to the enclosed drawing; it shows.

DETAILED DESCRIPTION OF THE PREFERRED EMBODIMENT

Figure 1:
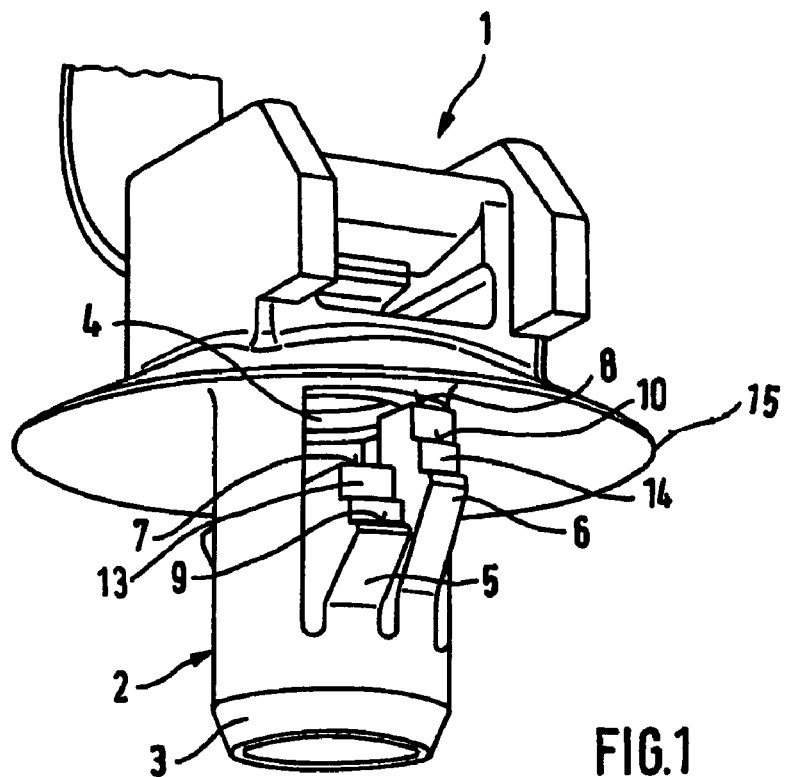
FIG. 1, a perspective representation of an embodiment of the fixing element according to the invention.
Figure 2:
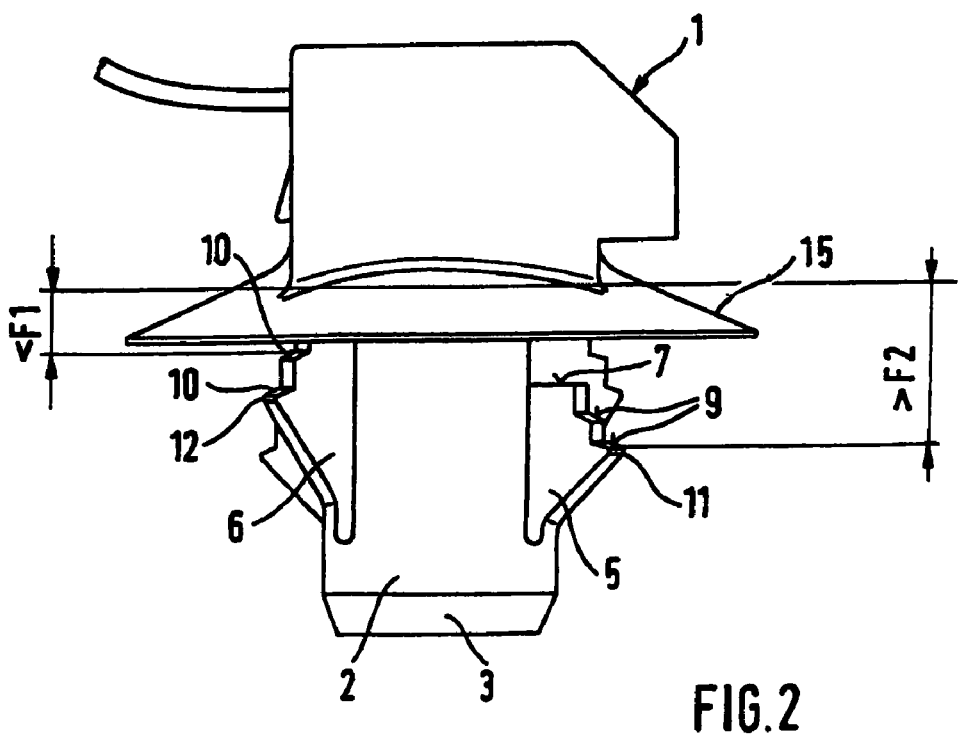
FIG. 2, a side view of the fixing element according to FIG. 1 in connection with the covered material thickness range F.
Figure 3:
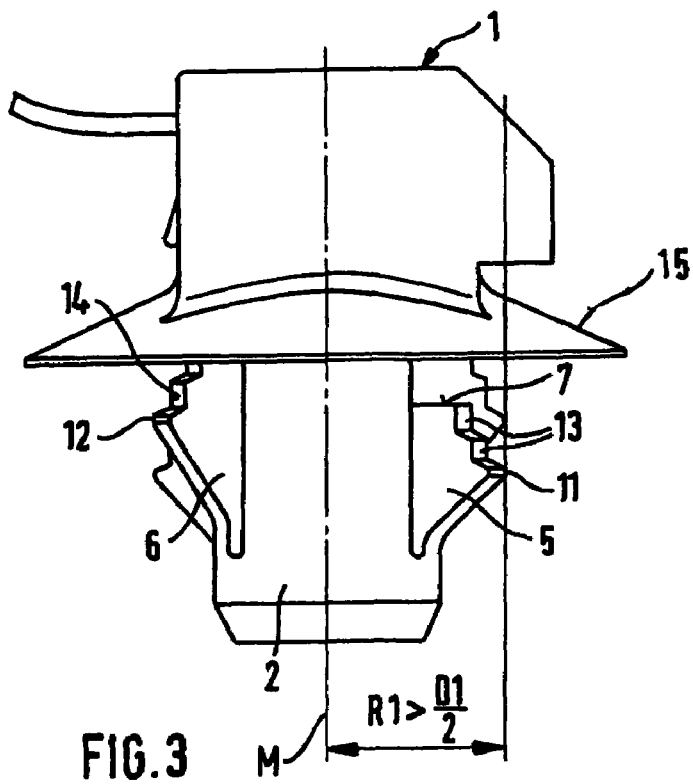
FIG. 3, the side view according to FIG. 2 in connection with the covered bore diameter range.
Figure 5:
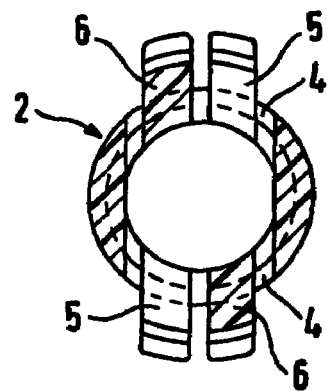

FIGS. 1–3 show different views of a fixing element with a retaining part 1 for the component to be fixed on the preferably plate-shaped support part that is not illustrated in the figures, e.g., a mounting plate, and an anchor foot 2 that is rigidly connected to the retaining part 1 and serves for rigidly anchoring the fixing element in a continuous bore of the support part. The present invention essentially pertains to the design of this anchor foot 2. The anchor foot 2 has the form of a hollow cylinder, the wall of which conventionally is slightly beveled 3 on its free end in order to simplify the insertion of the anchor foot 2 into the bore of the support part. The cylindrical wall of the anchor foot 2 is provided with two opposing openings 4 that extend as far as the retaining part 1. Two spring arms 5, 6 lie adjacent to one another and protrude from the lower edge of each opening 4, wherein the spring arms are spread apart in pairs in the direction of the retaining part 1. The spring arm pair 5 is shorter than the spring arm pair 6. The arrangement is chosen such that the shorter spring arm 5 on one opening 4 lies directly opposite the longer spring arm 6 on the other opening 4 and vice versa (in this respect, see also FIG. 5). Thus, the spring arm pairs 5 and 6 have faces 7 and 8 that lie in different horizontal planes. When the anchor foot 2 is inserted into a bore provided in the support part for this purpose, the faces 7 or 8 of one or the other spring arm pair 5, 6 come in contact with the underside of the support part as a function of the material thickness of the support part. In order to allow the anchoring of the fixing part according to the invention in support parts with more than two given material thicknesses and to make it possible to cover an entire range of material thicknesses, the spring arms 5, 6 contain several (in the embodiment shown, two) steps from their respective face 7, 8 to their respective outer edge 11, 12. These steps respectively comprise horizontal step surfaces 9, 10 (in this respect, see also FIG. 2) that are directed toward the retaining part. The step surfaces 9, 10 of one spring arm pair 5, 6 lie in the same planes respectively, but in different planes relative to the other spring arm pair 6, 5. In the embodiment shown, the faces 7, 8 and the step surfaces 9, 10 of the spring arm pairs 5, 6 consequently form contact surfaces for the underside of a support part in six different planes in small increments. A broad range of material thicknesses of the support part can thereby be covered in very small increments. A continuous adaptation to the values of the material thickness is achieved between the increments due to the effect of the umbrella-shaped stop 15 that is arranged between the retaining part 1 and the anchor foot 2 and comes in elastic contact with the upper side of the support part. In one specific instance, this was realized for a material thickness range between F1=0.6 mm and F2=3.0 mm (see FIG. 2).

Figure 4:
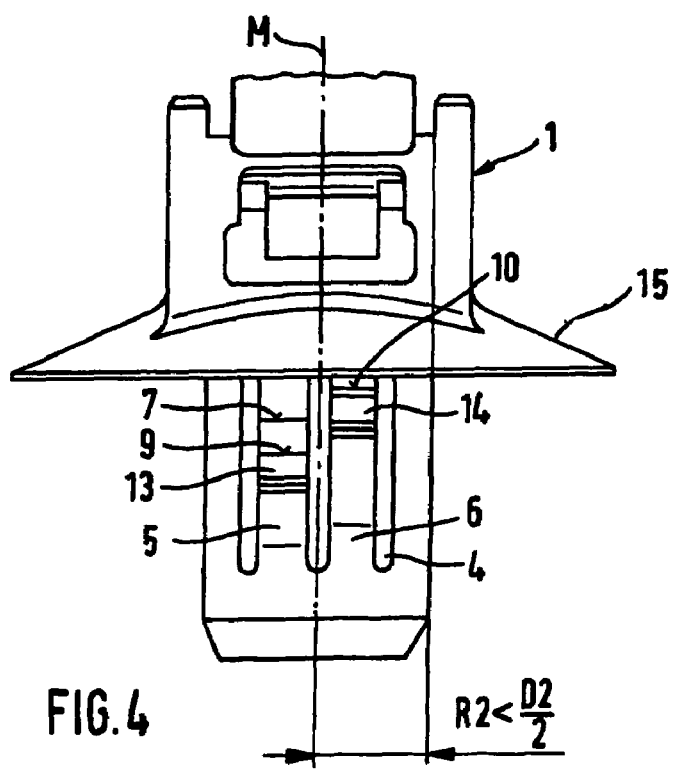
FIG. 4, a side view of the fixing element that is turned by 90° relative to FIG. 3, namely in connection with the covered bore diameter range, and FIG. 5, a scaled-down cross section through the anchor foot above the shorter spring arm pair in FIG. 4.

As mentioned above, the spring arms 5, 6 are spread apart in the direction of the retaining part 1, as far as the outer edge 11, 12 of the respectively lowest step surface 9, 10 that defines the longest radial distance R1 from the center axis M of the fixing element (see FIGS. 3 and 4). In addition to the horizontal step surfaces 9, 10, the steps on the spring arms 5, 6 also comprise vertical contact surfaces 13, 14, the radial distance of which decreases from the center axis M on the ensuing steps that ascend in this direction. When the fixing element is inserted, the vertical contact surfaces 13, 14 come in contact with the circumferential surface of the bore. If the bore has a small diameter, the spring arms 5, 6 move into the anchor foot 2 through the openings 4 until the appropriate contact surface is reached. This offset arrangement of the short and long spring arms 5, 6 also makes it possible for these spring arms to carry out such a movement without impairing one another during the insertion into a narrow bore. The spring arms 5, 6 are able to cover a broad bore diameter range due to the different radial distances of the contact surfaces from the center axis M; the shortest radial distance R2 possible corresponds to the diameter of the anchor foot 2 (see FIG. 4). In one specific example, this was realized for a bore diameter range between D1=6.2 mm and D2=7.2 mm.

The longest radial distance R1 from the center axis M, i.e., that of the outer edges 11, 12 of the spring arms 5, 6, is chosen such that 2×R1 is greater than the largest bore diameter D1 in order to prevent the anchor foot 2 from disengaging when the fixing element is laterally loaded. The shortest radial distance R2, i.e., the diameter of the anchor foot 2, is such that 2×R2 is slightly smaller than the smallest bore diameter D2 so that the fixing element can be mounted without problem.

The described fixing element consequently can be utilized in a functionally reliable fashion over a broad bore diameter range and over a broad material thickness range of the support part. If the steps on the spring arms 5, 6 are offset in such a way that the step surfaces 9, 10 of both spring arm pairs 5, 6 alternately come in contact with the underside of support parts of different material thicknesses and the contact surfaces 13, 14 of both spring arm pairs 5, 6 alternately come in contact with the circumferential surface of bores with different diameters, both ranges can be covered almost continuously in very small increments. With respect to the range of material thicknesses, a continuous adaptation between the increments is achieved with the aid of the umbrella-shaped stop 15 that comes in elastic contact with the upper side of the support part.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

The invention claimed is:

1. A fixing element for fixing a component on a support part, wherein said fixing element comprises:
   a retaining part for the component to be fixed,
   a hollow anchor foot for anchoring the fixing element in a continuous bore of the support part, and
   a spring stop that is arranged between the retaining part and the anchor foot, wherein a wall of the anchor foot contains two opposing openings, wherein two spring arm pairs that are spread apart in a direction of the retaining part respectively originate at a lower edge of said openings, each of said two spring arm pairs comprising a short spring arm (5) and a long spring arm (6), wherein the spring arms have faces that adjoin the support part after it is inserted into the bore of the support part, and wherein the faces of said long and short spring arms lie in two different horizontal planes, characterized by the fact that the short spring arms (5) as well as the long spring anus (6) radially widen in the direction of the retaining part (1), from a lower edge of the respective opening (4) to an outer edge (11) of the short spring arms (5) and an outer edge (12) of the long spring arms (6), and are then radially recessed up to their respective face (7, 8) in a form of several steps such that several horizontal step surfaces (9, 10) are formed in different planes and several vertical contact surfaces (13,14) are formed at different radial distances from a center axis (M) of the fixing clement on each spring arm (5,6), wherein the faces (7,8) and the individual horizontal step surfaces (9,10) of one spring arm pair (5,6) lie in similar respective planes and its corresponding individual vertical contact surfaces (13, 14) lie at similar respective radial distances from the center axis (M), but in different planes and at different radial distances from the center axis (M) relative to the other spring arm pair (6,5), further wherein the horizontal step surfaces on the short spring arms (5) and the horizontal step surfaces on the long spring arms (6) are offset relative to one another in such a way that the faces (8) or horizontal step surfaces (10) of the long spring arms (6) and the faces (7) or horizontal step surfaces (9) of the short spring arms (5) are alternately brought into contact with an underside of the support part as a material thickness thereof increases and the vertical contact surfaces (13) of the short spring arms (5) and the vertical contact surfaces (14) of the long spring arms (6) accordingly are alternately brought in contact with a circumferential surface of the bore as a diameter thereof increases (D2 to D1), and further wherein at least one radial distance (R1) between an outer edge (11,12) of one spring arm (5,6) and the center axis (M) of the fixing element is longer than half a diameter (D1/2) of the bore in the support part by such an amount that the anchor foot (2) is secured therein and by the fact that the shortest possible radial distance (R2) between the base of the spring arms (5,6) and the center axis (M) is slightly less than half the diameter (D2/2) of the bore in the support part.

2. A fixing element for fixing a component on a support part, comprising:
   a retaining part,
   a spring stop coupled to said retaining part, and
   an anchor foot coupled to said spring stop, said anchor foot comprising a plurality of spring arms, said plurality of spring arms comprising at least one short spring arm and at least one long spring arm, wherein each of said plurality of spring arms is:
   biased to extend from a body surface of said anchor foot,
   capable of being compressed, and
   radially recessed such that a plurality of substantially horizontal surfaces are formed in a plurality of different planes and a plurality of substantially vertical contact surfaces are formed at a plurality of different radial distances from a center axis of said fixing element, said spring arms being arranged such that said plurality of different planes of said at least one short spring arm alternate with said plurality of different planes of said at least one long spring arm wherein at least one of said plurality of different radial distances is greater than half of a diameter of a bore of said support part, said bore capable of receiving said anchor foot, and an anchor foot radial distance from said center axis of said fixing element to said body surface of said anchor foot is less than half of said diameter of said bore of said support part.

3. The fixing element of claim 2, wherein each of said plurality of substantially horizontal surfaces formed on a first short spring arm of said at least one pair of short spring arms lies in a substantially similar plane to one of said plurality of substantially horizontal surfaces formed on a second short spring arm of said at least one pair of short spring arms.

4. The fixing element of claim 3, wherein each of said plurality of substantially vertical contact surfaces formed on said first short spring arm lies at a first radial distance from said center axis of said fixing element approximately equal to a second radial distance from said center axis of said fixing element corresponding to one of said plurality of substantially vertical contact surfaces formed on said second short spring arm.

5. The fixing element of claim 3, wherein each of said plurality of substantially horizontal surfaces formed on a first long spring arm of said at least one pair of long spring arms lies in a substantially similar plane to one of said plurality of substantially horizontal surfaces formed on a second long spring arm of said at least one pair of long spring arms.

6. The fixing element of claim 3, wherein each of said plurality of substantially vertical contact surfaces formed on a first long spring arm of said at least one pair of long spring arms lies at a first radial distance from said center axis of said fixing element approximately equal to a second radial distance from said center axis of said fixing element corresponding to one of said plurality of substantially vertical contact surfaces formed on a second long spring arm of said at least one pair of long spring arms.

7. The fixing element of claim 2, wherein each of said plurality of substantially horizontal surfaces formed on a first long spring arm of said at least one pair of long spring arms lies in a substantially similar plane to one of said plurality of substantially horizontal surfaces formed on a second long spring arm of said at least one pair of long spring arms.

8. The fixing element of claim 7, wherein each of said plurality of substantially vertical contact surfaces formed on said first long spring arm lies at a first radial distance from said center axis of said fixing element approximately equal to a second radial distance from said center axis of said fixing element corresponding to one of said plurality of substantially vertical contact surfaces formed on said second long spring arm of said at least one pair of long spring arms.

9. The fixing element of claim 2, wherein said spring stop and said plurality of spring arms are capable of cooperating such that said fixing element is secured to said support part.

10. The fixing element of claim 2, wherein said anchor foot further comprises a plurality of openings.

11. The fixing element of claim 10, wherein said plurality of spring arms are coupled to said openings.

12. A fixing element for fixing a component on a support part, comprising:
a retaining part,
a spring stop coupled to said retaining part, and
an anchor foot coupled to said spring stop, said anchor toot comprising a plurality of spring arms, said plurality of spring arms comprising at least one pair of short spring arms and at least one pair of long spring arms, wherein each of said plurality of spring arms is:
biased to extend from a body surface of said anchor foot,
capable of being compressed, and
radially recessed such that a plurality of substantially horizontal surfaces are formed in a plurality of different planes and a plurality of substantially vertical contact surfaces are formed at a plurality of different radial distances from a center axis of said fixing element, said spring arms being arranged such that said plurality of different planes of said at least one short spring arm alternate with said plurality of different planes of said at least one long spring arm, and further wherein:
said spring stop and said plurality of spring arms are capable of cooperating such that said fixing element is secured to said support part,
each of said plurality of substantially vertical contact surfaces formed on a first long spring arm of said at least one pair of long spring arms lies at a first radial distance from a center axis of said fixing element approximately equal to a second radial distance from said center axis of said fixing element corresponding to one of said plurality of substantially vertical contact surfaces formed on a second long spring arm of said at least one pair of long spring arms,
each of said plurality of substantially horizontal surfaces formed on said first long spring arm lies in a substantially similar plane to one of said plurality of substantially horizontal surfaces formed on said second long spring arm,
said anchor foot further comprises a plurality of openings,
said plurality of spring arms are coupled to said openings, and at least one of said plurality of different radial distances is greater than half of a diameter of a bore of said support part, said bore capable of receiving said anchor foot, and an anchor foot radial distance from said center axis of said fixing element to said body surface of said anchor foot is less than half of said diameter of said bore of said support part.

13. The fixing element of claim 12, wherein each of said plurality of substantially vertical contact surfaces formed on a first short spring arm of said at least one pair of short spring arms lies at a third radial distance from said center axis of said fixing element approximately equal to a fourth radial distance from said center axis of said fixing element corresponding to one of said plurality of substantially vertical contact surfaces formed on a second long spring arm of said at least one pair of long spring arms.

14. The fixing element of claim 13, wherein each of said plurality of substantially horizontal surfaces formed on said first short spring arm lies in a substantially similar plane to one of said plurality of substantially horizontal surfaces formed on said second short spring arm.

15. The fixing element of claim 12, wherein each of said plurality of substantially horizontal surfaces formed on a first short spring arm of said at least one pair of short spring arms lies in a substantially similar respective plane to one of said plurality of substantially horizontal surfaces formed on a second short spring arm of said at least one pair of short spring arms.

* * * * *

UNITED STATES PATENT AND TRADEMARK OFFICE
CERTIFICATE OF CORRECTION

PATENT NO. : 7,186,068 B2
APPLICATION NO. : 10/529134
DATED : March 6, 2007
INVENTOR(S) : Viktor Zoubek and Vaclav Sasek It is certified that error appears in the above-identified patent and that said Letters Patent is hereby corrected as shown below:

| Column | Line | |
|---|---|---|
| 6 | 11 | Replace "anus" with -- arms -- |
| 7 | 22 | Replace "clement" with -- element -- |

Signed and Sealed this

Fifth Day of June, 2007

JON W. DUDAS
*Director of the United States Patent and Trademark Office*